United States Patent [19]

Zumwinkel et al.

[11] Patent Number: 4,602,707
[45] Date of Patent: Jul. 29, 1986

[54] VEHICULAR SHOCK ABSORBING DEVICE WITH IMPROVED COMPRESSION HEAD ASSEMBLY

[75] Inventors: Deborah A. Zumwinkel, Warrenville; Gerald D. Anderson, Elburn; Kishakke V. Unnikrishnan, Glendale Heights, all of Ill.

[73] Assignee: Maremont Corporation, Carol Stream, Ill.

[21] Appl. No.: 798,706

[22] Filed: Nov. 15, 1985

Related U.S. Application Data

[63] Continuation of Ser. No. 530,910, Sep. 12, 1983, abandoned.

[51] Int. Cl.⁴ ............................................. F16F 9/348
[52] U.S. Cl. ................................. 188/315; 137/493.3; 137/512.2; 188/322.14
[58] Field of Search .............. 188/315, 322.13, 322.14, 188/322.15, 282, 317; 137/493.6, 493.3, 512.2; 280/714

[56] References Cited

U.S. PATENT DOCUMENTS

| | | | |
|---|---|---|---|
| 2,596,982 | 5/1952 | Chisholm, Jr. ............. | 188/322.14 X |
| 2,712,588 | 7/1955 | Epstein ..................... | 219/374 |
| 2,726,737 | 12/1955 | Chisholm, Jr. ............. | 137/493.6 X |
| 2,818,942 | 1/1958 | Bliven ....................... | 188/317 X |
| 2,945,501 | 7/1960 | Bloom ....................... | 137/493.6 |
| 3,029,332 | 4/1962 | Cotts ........................ | 219/374 |
| 3,102,185 | 8/1963 | Boyd et al. ................ | 219/374 |
| 3,440,400 | 4/1969 | Cotts ........................ | 219/374 |
| 3,532,114 | 10/1970 | DeFrees .................... | 219/374 |
| 3,547,498 | 12/1970 | Bueler ...................... | 137/493.3 X |
| 3,631,525 | 12/1971 | Brasch ...................... | 219/374 |
| 3,794,810 | 2/1974 | Brasch et al. ............. | 219/374 |
| 3,851,147 | 11/1974 | Hachmeister .............. | 219/381 |
| 4,109,767 | 8/1978 | Nandyal et al. ........... | 188/322.14 X |
| 4,182,438 | 1/1980 | Pepi .......................... | 188/322.14 |
| 4,438,834 | 3/1984 | Handke et al. ............ | 188/315 X |

FOREIGN PATENT DOCUMENTS

| | | | |
|---|---|---|---|
| 206053 | 1/1955 | Australia ................. | 188/322.14 |
| 662092 | 11/1951 | United Kingdom ..... | 188/315 |
| 2090643 | 7/1982 | United Kingdom ..... | 188/322.14 |

OTHER PUBLICATIONS

"Electric Blast Coil Duct Heater", by Indeeco, 06/10/1963, p. 30.

*Primary Examiner*—George E. A. Halvosa
*Attorney, Agent, or Firm*—Allegretti, Newitt, Witcoff & McAndrews, Ltd.

[57] ABSTRACT

An improved shock absorbing device includes a compression head assembly of simpler, less expensive, and more efficient design than prior art compression head assemblies. The compression head assembly of this invention includes an improved valve, a base plate, an annular disk valve, first and second bias members, and a valve stop. The valve is made of a generally elongated, preferably cylindrical, body with an outwardly extending flange having one or more passages therethrough. The base member has a disk shape with an opening centrally therethrough. The valve stem is assembled in relation to the base member such that the generally cylindrical body is inserted through the opening. The outwardly extending flange of the valve abuts against and forms a seal with the base member. An annular disk valve is assembled over the generally cylindrical body of the valve stem so as to abut the flange portion of the valve and close the passages through the flange. A first bias member urges the annular disk valve into abutment with the flange, thereby maintaining a closure of the passages in normal orientation. A second bias member urges the valve flange into abutment and sealing contact with the base member. The valve stop maintains the first and second bias members between in biased position.

13 Claims, 5 Drawing Figures

U.S. Patent    Jul. 29, 1986    Sheet 1 of 2    4,602,707
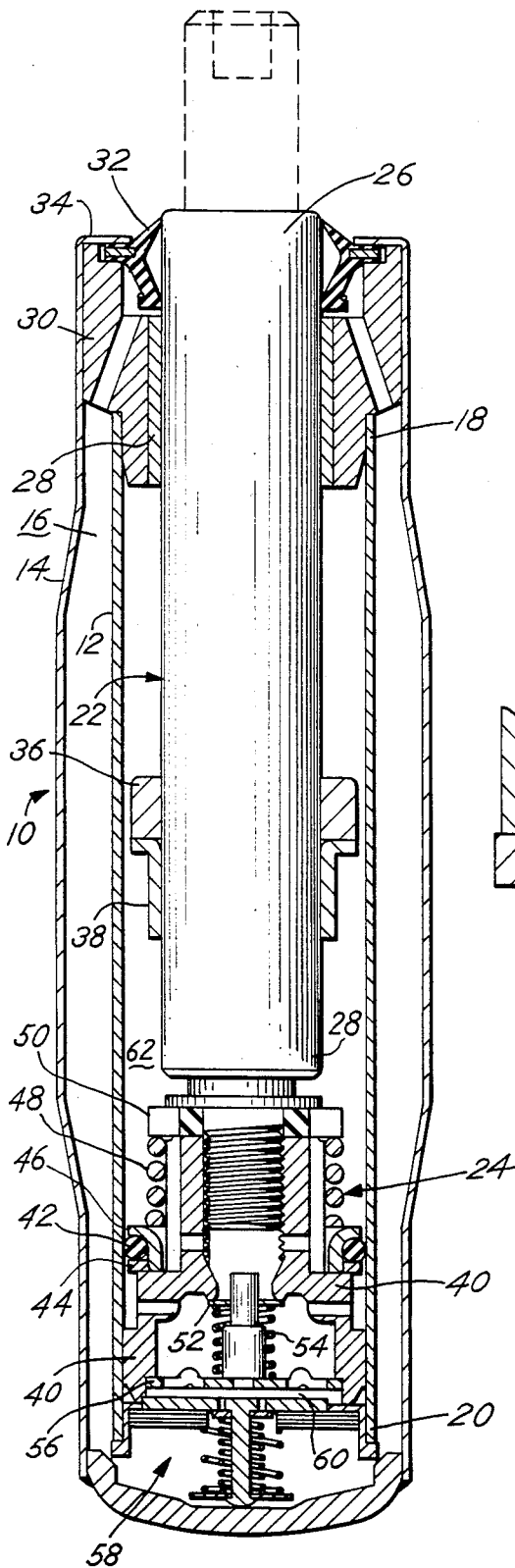
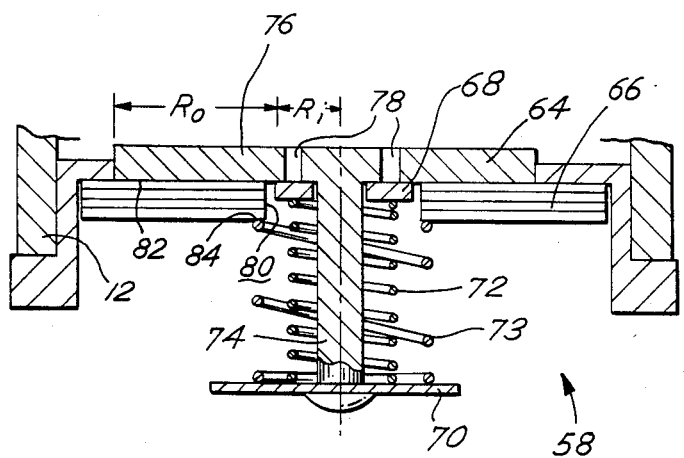

VEHICULAR SHOCK ABSORBING DEVICE WITH IMPROVED COMPRESSION HEAD ASSEMBLY

This application is a continuation of application Ser. No. 530,910, filed Sept. 12, 1983, now abandoned.

BACKGROUND OF THE INVENTION

The present invention relates to an improved valve structure for a shock absorbing device. More particularly, the present invention relates to a simplified, more economical valve stem and compression head assembly for shock absorbing devices, especially for shock absorbing vehicle struts. As used herein, "shock absorbing device" refers to both conventional shock absorbers and struts, as well as replacement cartridges for struts.

As known to those of skill in the art, conventional shock absorbers are generally used in vehicular suspension systems wherein the tire wheel attaches to a spindle which, in turn, joins upper and lower control arms. A spring works between the vehicle frame and one of the control arms to provide biased support for the weight of the vehicle. The shock absorber controls oscillations of the spring.

A strut assembly is generally used in a vehicular suspension system that eliminates the spindle, the upper control arm, and the related components. The strut attaches directly between the lower control arm and the car body, to support the weight of the vehicle and to control oscillations of movement. The strut assembly has become much favored for suspension systems in recent years because it provides a much lighter, more space efficient design.

Conventional shock absorbers and struts both provide shock dampening action by placing a moving piston in a defined fluid chamber and restricting the flow of fluid within the chamber in response to the piston movement. Conventional shock absorbers and struts both have valving systems in the bottom of the shock absorbing structure, i.e., compression head assemblies, to help control the flow of fluid in the chamber. When the piston moves downward in the chamber, fluid flows out of the lower portion of the chamber; in such a sequence, the shock absorbing device is referred to as being in a "compression mode." When the piston moves upward in the chamber, fluid flows back into the lower portion of the chamber; in this sequence, the shock absorbing device is referred to as being in a "recoil mode."

The compression head assemblies in conventional shock absorbers typically have a dual valve port design. A first valve in a first valve port acts as a compression valve to permit fluid to flow out of the chamber when the device is in a compression mode. A second valve and valve port acts as a replenishing valve, to permit fluid to flow back into the chamber when the device is in a recoil mode. Representative designs of such shock absorbers are shown in Szostak, U.S. Pat. No. 3,127,958 and Damon, U.S. Pat. Nos. 3,181,656 and 3,213,973.

The compression valve components of dual element valve assemblies are sometimes manufactured by a relatively fast and efficient metal stamping operation. Such a valve stem and method is shown in Pepi, U.S. Pat. No. 4,182,438.

Struts differ from conventional shock absorbers with respect to several internal configurations. Since the strut is a load bearing member of the suspension system, whereas the conventional shock absorber is not, the piston and related members of a strut are bigger and stronger than are the comparable members of a shock absorber. One result is that a substantially greater volume of fluid flows in and out of the strut's fluid chamber than flows in and out of the shock absorber's fluid chamber, as the piston moves up and down in the chamber. In order to accommodate the greater fluid flow, the valving for the compression head in a strut requires larger openings than the comparable valving for the compression head assembly of a conventional shock absorber. In order to make room for the larger openings, struts generally have a single port compression head design. That is, a single valve defines both a first passageway for fluid flow out of the chamber during the compression mode and second passageway for fluid flow into the chamber during the recoil mode. Of course, the combination valve element design might also be used in a conventional shock absorber. Representative designs of a single element structure as shown in De Koning et al., U.S. Pat. No. 2,849,090, Palmer, U.S. Pat. No. 3,757,910, and a French Pat. No. 1,058,601.

SUMMARY OF THE INVENTION

Thus, an object of the present invention is to provide an improved shock absorbing device and method of making same.

A further object of the invention is to provide an improved valve structure and compression head assembly for a shock absorbing device and method of making same.

A still further object of the invention is to provide a valve stem and compression head assembly that are of simplified, less complex design and that can be manufactured by more efficient, less expensive manufacturing techniques than prior valve stems and compression head assemblies.

Yet another object of the present invention is to provide a valve stem and compression head assembly that has less mass for faster response, greater durability and lower cost than prior valve stems and compression head assemblies.

These and other objects, advantages, and features of the invention will be more fully detailed in the following disclosure.

In a principal aspect, this invention comprises a shock absorbing device for a vehicle. The shock absorbing device of this invention includes a cylinder that has a cylindrical axis and first and second ends. A piston rod extends axially and outwardly away from the first end of the cylinder. A piston assembly, having an axis that is axially aligned with the cylindrical axis, is mounted on the piston rod within the cylinder, thereby dividing the cylinder into a compression chamber located between the piston assembly and the second end of the cylinder and a rebound or recoil chamber located between the piston assembly and the first end of the cylinder. A compression head assembly is secured within the cylinder near the second end of the cylinder. The relative volumes of the compression chamber and the recoil chamber vary as the piston assembly slides back and forth within the cylinder in either the compression or the recoil mode.

This invention provides an improved compression head assembly and, in particular, an improved valve stem for the compression head assembly. The invention also comprises a method of manufacturing the improved valve stem and compression head assembly and, thus, the shock absorbing device that results from using such valve stems and compression head assemblies. In particular, the compression head assembly of this invention includes a base member and a valve assembly that permits fluid flow into and out of the compression zone, across the base member, as the piston assembly moves slidably back and forth within the cylinder. More specifically, the compression head assembly of this invention comprises a one piece valve stem, a base member, an annular disk valve, a valve stop and a first and a second bias member.

The one piece valve stem includes a flange portion and a generally elongated body. The generally elongated body has a first end, a second end, an axis, and, preferably, a shoulder portion therebetween. The first end terminates at the flange portion, which extends generally radially outward from the axis of the elongated body. The flange portion includes an inner radial area, an outer radial area, and a plurality of passages through the flange portion within the inner radial area.

The base member includes first and second, generally opposite sides, as well as an opening therethrough. The opening is larger than the inner radial area of the flange portion of the one piece valve stem. The portions of the first and second sides of the base member that lie adjacent the opening define a base valve seat and a base retaining shoulder, respectively.

The generally cylindrical body of the one piece valve stem fits slidably, and preferably concentrically, through the opening of the base member for reciprocal movement between a first position and a second position vis-a-vis the base member. When the one piece valve stem is in the first position, the flange portion of the one piece valve stem abuts the base valve seat of the base member. When the one piece valve stem is in the second position, its flange portion is spaced apart from the base valve seat of the base member.

The annular disk valve fits slidably around the generally elongated body of the one piece valve stem. The annular disk valve slides reciprocally back and forth on the generally elongated body between a first position and a second position vis-a-vis the flange portion of the one piece valve stem. In the first position, the annular disk valve abuts and is retained by the flange portion of the one piece valve stem. In the second position, the disk valve is spaced apart from the flange portion, but still fitted slidably around the generally cylindrical body of the one piece valve stem. The annular disk valve is preferably of sufficient size to cover the inner radial area of the flange, or at least the passages therethrough, when the annular disk valve is in its first position.

The valve stop member is secured to the closed second end of the elongated body, generally opposite the flange portion of the one piece valve stem and opposite the base member. The first and second bias members are positioned between the valve stop (on the one hand) and the annular disk valve and the base retaining shoulder, respectively, (one the other hand) in order to bias the annular disk valve and the one piece valve stem, respectively, toward their first positions.

More particularly, the first bias member is positioned between the annular disk valve member and the valve stop. In normal orientation, the first bias member urges the annular disk valve towards its first position in abuttment with the flange portion of the one piece valve stem. In this first position, the annular disk valve member closes the passages through the flange portion of the one piece valve stem. When the piston assembly moves downwardly within the cylinder during the compression mode, fluid pressure is transmitted through the passages of the flange portion and is exerted against the annular disk valve member. As the pressure drop across the annular disk valve member increases, the force exerted by the pressure drop overcomes the force of the first bias member, and the annular disk valve member slidably moves away from its first position and toward its second position. As a result, fluid flows through the passages, across the compression head, and out of the compression chamber, thereby relieving the pressure build up.

The second bias member is positioned between the base retaining shoulder of the base member and the valve stop. In normal orientation, the second bias member urges the valve stop and the generally elongated body toward the second end of the cylinder, such that the flange portion of the one piece valve stem moves toward its first position in abuttment with the base valve seat of the base member. In this way, the first bias member urges the flange portion of the one piece valve stem to close the opening through the base member. When the piston assembly moves upward within the chamber during the recoil mode, a pressure drop develops across the compression head in the opposite direction of the pressure drop developed during the compression mode. Once the force exerted by the pressure drop overcomes the bias force of the second bias member, the one piece valve stem moves away from its first position and toward its second position. As a result, the flange portion of the one piece valve stem moves away from abuttment with the opening through the base member, and fluid may flow through that opening, across the compression head assembly, and into the compression chamber, thereby relieving the pressure build up.

In a preferred embodiment of the invention disclosed more fully hereinafter, the flange portion of the one piece valve stem extends radially outward from the cylindrical axis in an arcuate or elliptical manner, defining a sealing surface on the flange portion of the one piece valve stem which is generally transverse to the opening in the base member. The base member is preferably coined around the opening to define a base valve seat which is also generally transverse to the opening of the base valve member.

Also, as preferred and more fully described herein, the elongated body is cylindrical, and the flange portion of the one piece valve stem includes at least one shoulder section which surrounds the passages through the flange portion. The shoulder section defines a flange valve seat, which the annular disk valve abuts in its first position to thereby close the passages through the flange portion. The flange portion may further include a recessed area adjacent the passages and within the area surrounded by the shoulder section such that, when the annular disk valve is in its first position in abuttment with the shoulder section, the disk valve and the one piece valve stem define a space which communicates with the passages through the flange portion. The space provides a mechanical advantage by which the fluid pressure may act against the annular disk valve during the compression mode to overcome the force exerted by the first bias member.

The invention also comprises a method of manufacturing the compression head assembly, in particular the one piece valve stem, that is more efficient and less expensive than prior art manufacturing methods. More specifically, prior art valve stems for single element compression head assemblies were manufactured through expensive and time consuming metal machine operations. The cylindrical body of the valve stem was typically solid metal and was machined from bar stock of a diameter approximating the diameter of the flange portion. The design was uneconomical of machine time and of material. In the present invention by way of contrast, the one piece valve stem can be manufactured by a simple cold stamping or cold forming operation. The ability of using simpler techniques for manufacturing the present compression head assembly is attributable to the greater overall simplicity of design of the present compression head assembly and valve stem.

DESCRIPTION OF THE DRAWINGS

The preferred embodiment of the present invention will be described in relation to the accompanying drawing, wherein:

FIG. 1 is a cross-sectional view of a replacement cartridge for a strut, which cartridge includes a simplified version of the compression head assembly and valve stem according to present invention.

FIG. 2 is an expanded, cross-sectional diagram of the simplified version of the compression head assembly and valve stem shown in FIG. 1.

DETAILED DESCRIPTION OF THE PREFERRED EMBODIMENT

Figure 3:
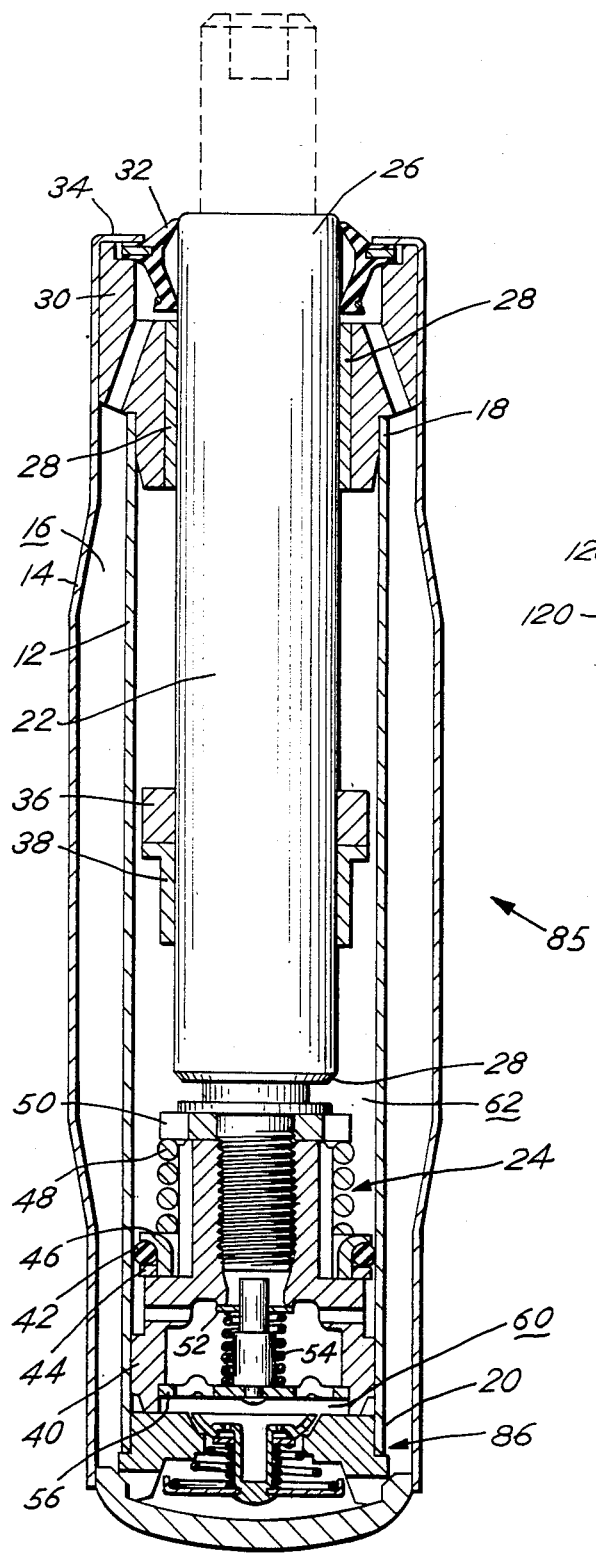
FIG. 3 is a cross-sectional view of a replacement cartridge for a strut, wherein the cartridge includes a particularly preferred embodiment of a compression head assembly and valve stem according to the present invention.

Referring to FIG. 1, a strut replacement cartridge, generally 10, includes an inner cylinder 12 mounted concentrically within an intermediate cylinder 14 so as to define a generally annular interspace 16 between the inner cylinder 12 and intermediate cylinder 14. The annular interspace 16 acts as a fluid reservoir in a manner that will be explained shortly. The inner cylinder 12 includes first and second ends, 18 and 20, respectively. When the cartridge 10 is in normal orientation, the first end 18 defines the top of the cylinder 12, and the second end 20 defines the bottom of the cylinder 12.

A piston rod 22 and piston assembly, generally 24, are mounted within the inner cylinder 12. The rod 22 includes a first end 26 and a second end 28. The rod 22 extends axially out of the inner cylinder 12 such that the first end 26 of the rod 22 is normally above the first end 18 of the inner cylinder 12. The second end 28 of rod 22 lies within the inner cylinder 12. The piston assembly 24 is mounted on the piston rod 22 at the second end thereof, 28, and, thus, within the inner cylinder 12.

A guide bushing 28, inner cylinder head 30, and rod seal 32 surround the rod 22 at the first or top end 18 of the inner cylinder 12 in a manner known to one of ordinary skill in the art, permitting the rod 22 to move slidably and axially in relation to the inner cylinder 12 and the piston assembly 24 to move up and down within the inner cylinder 12, such as when the vehicle encounters the normal bumps and shocks of driving. As shown in FIG. 1, the top portion 34 of the intermediate cylinder 14 is formed over the outer peripheral portion of the rod seal 32 in order to prevent the rod seal 32, the inner cylinder head 30, and the guide bushing 28 from being forced out of the replacement cartridge 10. Also as shown in FIG. 1, a recoil bumper 36 and a meal stop 38 are attached to the piston rod 22 in order to maintain an adequate separation between inner head and bushing assembly and the piston within the cylinder assembly to resist force couples on the rod 22 that are induced at the attachment points of the suspension elements to the strut or cartridge assembly and to prevent the rod 22 and piston assembly 24 from coming completely out of the inner cylinder 12, e.g., when the vehicle drives over excessively bumpy terrain.

As shown in FIG. 1, the piston assembly 24 includes a piston 40 mounted on the second or lower end 28 of piston rod 22. A piston seal 42 surrounded by a seal protector 44 and seal carrier 46 are mounted on the rod 22 concentrically around the lower portion of the piston 40. A bypass spring 48 and a bypass spring retainer 50 are also mounted concentrically around the piston 40, between the piston seal 42 and the rod 22, so as to maintain the position of the piston seal 42 in relation to the piston. A recoil valve 52, a recoil valve spring 54, and a recoil valve retaining clip 56 are mounted on the piston assembly 24 in such a way as to permit variable restriction of the fluid to flow across the piston assembly 24.

A compression head assembly generally 58 is secured within the cartridge 10 at the bottom or second end 20 of inner cylinder 12. The compression head assembly 58, in essence, defines the generally circular bottom of the inner cylinder 12 and functions as a selective barrier to communication between the interior of inner cylinder 12 and the annular interspace 16.

The design and assembly of the rod 22, piston assembly 24, and related components, may be any one of several designs known to those of ordinary skill in the art. In general, the piston assembly 24 divides the interior of the inner cylinder 12 into a first zone or compression chamber 60 and a second zone or recoil chamber 62. The compression chamber 60 comprises the space adjacent the lower portion or second end 20 of the inner cylinder 12, i.e., the space between the piston assembly 24 and the compression head 58, which is subject to relatively higher pressures when the piston assembly 24 moves downward during the compression mode of the shock absorbing device 10. The recoil chamber 62 comprises the space adjacent the upper portion or first end 18 of the inner cylinder 12, i.e., the space between the piston assembly 24 and the inner cylinder head 30 of the device 10, which is subject to relatively higher pressure when the rod 22 and piston assembly 24 move upward during the recoil mode of the device 10.

The simplified version of the compression head assembly 58 of this invention is shown more clearly in FIG. 2. In particular, the simplified version of the compression head assembly of this invention, shown in FIG. 2, includes a valve 64, a base member 66, an annular disk valve 68, a valve stop 70 and first and second bias members 72 and 73, respectively.

The one piece valve 64 comprises a generally elongated body 74 and a substantially flat, disk shaped member or flange 76 which extends radially outward from the elongated body 74. The one piece valve 64 is preferably formed in a single stamping or metal forming operation, such that the elongated member 74 extends substantially transverse to and concentric with the flange 76. In cross section, as shown in FIG. 2, the one piece valve 64 exhibits a T-shape. The flange 76 may be described by reference to an inter radial area, $R_i$, preferably circular in shape, and an outer radial area, $R_o$, preferably annular in shape and concentric with the inner radial area $R_i$. The one piece valve stem 64 further includes a plurality of openings 78 through the inner radial area $R_i$. The plurality of openings 78 permit limited and controlled fluid flow through the flange portion 76 of the one piece valve 64 in a manner to be described shortly.

The base member 66 is essentially disk shaped, securely attached around its periphery to the inner cylinder 12. The base member 66 has a preferably circular opening 80, preferably positioned concentric with the axis of the inner cylinder 12. The opening 80 should be of a size greater than the inner radial area $R_i$ of the flange 76. In preferred form, the inner radial area $R_i$ is substantially circular in shape, and the opening 80 is also circular, having a diameter larger than the diameter of the inner radial area $R_i$.

In manufacture of the compression head assembly 58, the generally elongated member 74 of the one piece valve 64 protrudes through the opening 80 of the base member 66 such that the flange 76 rests upon a first or the upper surface 82 of the base member 66.

The annular disk valve 68 has an inner opening large enough to be fitted over the elongated member 74 of the one piece valve stem 64. In manufacture, the annular disk valve 68 fits onto the one piece valve 64 in such a manner that the disk valve 68 slides back and forth along the generally elongated member 74. During operation of the shock absorbing device 10, the annular disk valve 68 slidably moves on the elongated member 74 between a first and a second position. The first and second positions substantially correspond with the recoil mode and compression mode, respectively, of the shock absorbing device 10. In the first position of the annular disk valve 68, corresponding with the recoil mode of the strut 10, the annular disk valve 68 abuts the surface of the flange 76 immediately adjacent to the elongated member 74. In this position, the annular disk valve 68 covers and blocks the openings 78 through the flange. In the second position of the annular disk valve 64 (not shown), corresponding with the compression mode, the annular disk valve 68 is spaced apart from the openings 78 through the flange 76 such that fluid may flow through the openings 78 and across the one piece valve member 64.

The valve stop 70 is secured to the elongated member 74 of the one piece valve 64. The first bias member 72 fits over the elongated member 74 between the annular disk valve 68 and the valve stop 70. In this manner, the first bias member 72 urges the annular disk valve 68 towards its first position in abuttment with the flange 76, covering the openings 78 through the flange 76.

The valve stem 64 is, itself, moveable in relation to the base member 66 between a first position and a second position. In the first position, corresponding with the compression mode, the flange 76 of the one piece valve 64 contacts and abuts the upper surface 82 of the base member 66. In this way, the flange 76 substantially blocks the opening 80 of the one piece base member 64 to thereby prevent any fluid flow through the opening 80, except for that which passes through openings 78 of the one piece valve stem 64. In the second position of the one piece valve 64, corresponding to the recoil mode of the shock absorbing device 10, the flange 76 is spaced apart from the base member 66, such that fluid may flow through the opening 80 between the flange 76 and the upper surface 82 of base member 66 and, thus, around the one piece valve 64 and flange 76.

The second bias member 73, fits over the elongated member 74 of the one piece valve 64 and between the bottom surface 84 of the base member 66 and the valve stop 70. In this way, the second bias member 73 urges the valve stop 70 away from the base member 66, thus urging the one piece valve 64 into its first position.

More particularly, with respect to the operation of the invention, when the compression head assembly 58 of this invention is in its normal or "relaxed" position, as shown in FIG. 2, the annular disk valve 68 is in its first position in abuttment with the flange portion 76, covering the openings 78 of the one piece valve 64, and the valve 64 with flange 76 is also in its first position in abuttment with the upper surface 82 and covering the opening 80 of the base member 66.

The space above the compression head assembly 58 corresponds to and communicates with the compression chamber 60. The space below the compression head assembly 58 corresponds to and communicates with the annular interspace or reservoir 16. In the compression mode of the strut 10, when the piston rod 22 and piston assembly 24 move downward in the inner cylinder 12 toward the compression head assembly 58, the fluid pressure level in the compression chamber 60 increases. As the fluid pressure in the compression chamber 60 increases, a pressure drop develops across the one piece valve 64 between the compression chamber 60 and the reservoir 16. This pressure drop acts against all exposed surfaces of the flange 76 forcing it downward against the upper surface 82 of the base member 66. As a result, a metal to metal seal forms between the flange 76 and the upper surface 82 of the base member 66, thereby preventing any fluid from flowing between the flange 76 and the base member 66.

The pressure drop of the compression mode also acts through the openings 78 against the annular disc valve member 68. The force exerted against the annular disk valve 68 by the fluid pressure drop is opposed by the force of the first bias member 72, urging the annular disk valve 68 towards its first position. As the force exerted by the fluid pressure drop becomes greater than, or overcomes, the force exerted by the first bias member 72, the annular disk valve member 68 moves away from its first position and towards its second position, sliding downward along the elongated member 74 and away from the flange 76. The openings 78 thereby become opened or unblocked and fluid flows from the compression chamber 60, through the openings 78, into the reservoir 16 and, thus, across the compression head assembly 58.

As the shock absorbing device 10 undergoes transition from the compression mode into the recoil mode, the difference in relative fluid pressure between the compression chamber 60 and the reservoir 16 disappears, and the pressure drop across the one piece valve 64 eqaulizes. As a result, the force exerted on the annular disk valve 68 by the first bias member 72 again becomes predominant, and the annular disk valve 68 is urged back into its first position, thereby blocking the openings 78.

When the shock absorbing device 10 is in the recoil mode, the fluid pressure in the compression chamber 62 is relatively lower than the fluid pressure in the reservoir 16. As a result, a pressure drop develops between reservoir 16 toward compression chamber 60, exerting a force against the annular disk valve member 68 and the one piece valve 64. The pressure drop acting against the annular disk valve 68 in the recoil mode exerts a force in a direction opposite the force of the pressure drop in the compression mode. Stated another way, the force of the pressure drop in the recoil mode reinforces the action of the first bias member 72, urging the annular disk valve 68 against the flange 76, thereby blocking the openings 78.

However, the fluid pressure drop of the recoil mode also acts against the one piece valve 64, exerting a force directly opposed to the force exerted on the one piece valve 64 by the second bias member 73. When the pressure drop between reservoir 16 and compression chamber 60 in the recoil mode becomes great enough, the force exerted by the pressure drop overcomes the opposing force of the second bias member 73, and the one piece valve 64 moves away from its first position and toward its second position, such that the flange 76 is spaced apart from the upper surface 82 of the base member 66. As a result, fluid flows through the opening 80 between the upper surface 82 and the flange member 76. Thus, fluid flows from reservoir 16 around the one piece valve 64 and back into the compression chamber 60. As the pressure drop from reservoir 16 to compression chamber 60 dissipates, the force of the second bias member 73 again becomes predominant, urging the one piece valve stem 64 back into its first position, as shown in FIG. 2.

It should be apparent to one of ordinary skill in the art having the benefit of this teaching that the dimensions of the fluid flow path in the compression mode can be designed substantially independent of the dimensions of the fluid flow path in the recoil mode. That is, the dimensions of the opening through the base plate, of the passages through the flange and the amount of bias in the first and second bias member can be selectively varied to control fluid flow in the respective modes.

FIG. 3 shows a replacement cartridge 85 for a strut which is substantially similar to the replacement cartridge 10 shown in FIG. 1. All members of the replacement cartridge 85, except for the compression head assembly 86, are similar in shape and function to those of FIG. 1, and common numbers have been assigned to such members accordingly. The compression head assembly 86, however, of FIG. 3 represents a particularly preferred embodiment of the present invention. Thus, the compression head assembly 86 of FIG. 3 and its compoments are newly identified.

Figure 4:
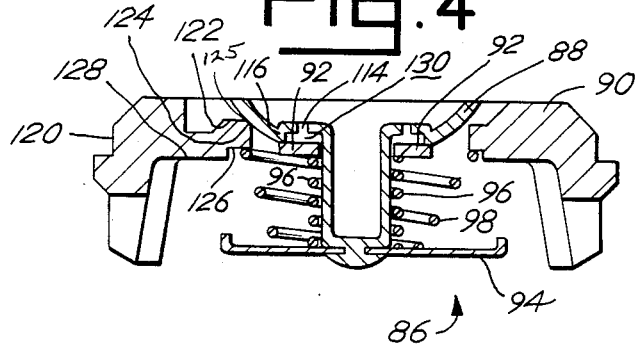
FIG. 4 is an expanded cross-sectional view of the particularly preferred compression head assembly and valve stem shown in FIG. 3.

Referring to FIG. 4, the particularly preferred embodiment of the compression head assembly 86 comprises the same general components as the the compression head assembly 58, namely, a one piece valve 88, a base plate 90, an annular disk valve 92, a valve stop 94, a first bias member 96 and a second bias member 98. However, in the particularly preferred embodiment, the components of the compression head assembly 86 are so designed as to be even more easily manufactured and provide even better functional response than the compression head assembly 58.

Figure 5:
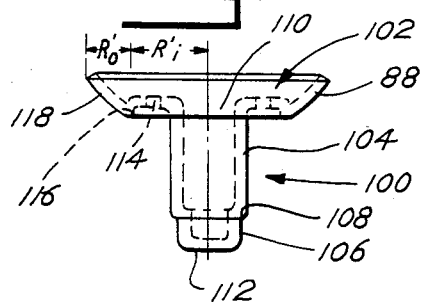
FIG. 5 is an expanded cross-sectional view of the particularly preferred valve stem shown in FIG. 3.

As shown in FIG. 5, the one piece valve 88, in particular, may be quickly and efficiently manufactured by a cold forming, metal stamping type operation. That is, a metal slug may be simply cold formed into the shape shown in FIG. 5. The resulting one piece valve stem 88 includes a lower, generally cylindrical body 100 and an upper generally spherical or cup shaped flange portion 102. The generally cylindrical body 100 includes a first section of relatively larger diameter 104 and a second section of relatively smaller diameter 106 with a shoulder portion 108 therebetween. The generally cylindrical body 100 further includes an open end 110 and a closed end 112. The portion of relatively smaller diameter 106 terminates at the closed end 112, whereas the open end 110 joins and merges into the generally spherical shaped flange 102.

The spherical shaped flange 102, like the substantially flat flange 76, projects radially outward from the center axis of the one piece stem 88. Also like the substantially flat flange 76, the spherical shaped flange 102 of the particularly preferred valve 88 may be described in reference to an inner radial area $R_i'$ and an outer radial area $R_o'$, and the cup shaped flange 102 has a plurality of passages 114 through the spherical shaped flange 102 within the inner radial area $R_i'$. The spherical shaped flange 102 differs from the flange 76 of valve stem 64 in that the spherical shaped flange 102 includes at least one shoulder section 116 surrounding the plurality of passages 114, thereby defining a flange valve seat 116 whose function will be more fully explained shortly. The spherical shaped flange 102 further differs from the flange 76 in that the radially outwardly extending portions 118, particularly those located in the outer radial area $R_o'$, extend in an arcuate or elliptical manner, generally transverse to the axis of the one piece valve 88, in order to more effectively form a seal with the base valve seat 124 in a manner that will be described shortly.

Referring back to FIG. 4, the base member 90 of the preferred compression head assembly 86 differs from the base member 66 of the simplified version of the compression head assembly 58 in at least three significant respects. The outer peripheral edge 120 of the base member 90 includes a ledge and other modifications such that the compression head assembly 86 is more effectively joined or attached to the second end 20 of inner cylinder 12. In addition, the first or upper surface 122 of the base member 90 is coined adjacent the opening therethrough in order to define a base valve seat 124. Bleed slots or channel shape passages 125 may preferably be coined into the base valve seat 124. The bleed slots, if provided, provide controlled fluid flow between the compression chamber 60 and the reservoir 16 during the compression portion of the piston stroke. Third, a shoulder or ledge 126 is formed into the second or bottom surface 128 of the base member 90 adjacent the opening through the base member, thereby forming a base retaining shoulder 126.

In construction of the compression head assembly 86, the generally cylindrical body 100 of the one piece valve 88 is inserted through the opening of the base member 90, substantially as previously described. However, the arcuate or elliptical portion 118 of the cup shaped flange 102 meets smoothly and securely with the coined valve seat 124 on the base member 90 to form an effective metal to metal, annular seal when the valve stem 88 is in its first position relative to the base member 90, as previously described in connection with FIGS. 1 and 2.

The annular disk valve 92 is fitted over the generally cylindrical body 100 together with the first and second bias members 96, 98. The valve stop 94 has a central opening of sufficient size to permit it to be fitted over the portion of relatively smaller diameter 106 of the cylindrical body 100, but not over the portion of relatively larger diameter 104. As a result, the valve stop 94 abuts against and comes to rest on the shoulder 108. The closed end 112 of the cylindrical body 100 is then riveted against the valve stop 94, thus securely attaching that valve stop 94 to the closed end 112 of the one piece valve 88. A process and machine known as an "orbital riveter" has proven particularly useful in this operation.

The size of the annular disk valve 92 should correspond with the size of the flange valve seat, or shoulder 116, which surrounds the passages 114 such that the annular disk valve 92 abuts and comes to rest against the flange valve seat 116 when the annular disk valve 92 is in its first position. In this way, the annular disk valve 92 and the flange valve seat 116 form a line contact, metal to metal seal when the disk valve 92 is in its first position.

A further advantage of forming the cup shaped flange 102 with the retaining shoulder or flange valve seat 116 is that when the disk valve 92 abuts the flange valve seat 116, an annular space 130 is formed within the recess between the cylindrical body 100, the cup shaped flange 102, and the annular disk valve 92. This space or recess 130 acts to provide a mechanical advantage for the force of the fluid pressure over the force of the first bias member 96 acting against the annular disk valve 92 when the pressure drop develops between the compression chamber 60 and the reservoir 16 in the compression mode.

The second bias member 98 is mounted between the base member 90 and the valve stop 94, similar to the mounting of second bias member 73 as described in connection with FIG. 2. However, in the particularly preferred embodiment of the compression head assembly 86, the second bias member 98 abuts the base member 90 at the base retaining shoulder 126 to thereby more securely and firmly orient and maintain the second bias member 98 in proper orientation.

Although two particular embodiments of the present invention have been disclosed herein, it should be understood that modifications and changes can be made without departing from the true scope and spirit of the invention. For example, the first and second bias members might include biasing devices other than coil springs. The shape of the valve stems or the base members might be varied in non-relevant aspects without changing the advantages provided by the design features of the present invention. Relative orientation of the valve vis-a-vis the base member and or the cylinder, might be varied, e.g., the normal orientation of up and down might be reversed, but without modifying the concept of the invention. The degree of fluid flow across the valve stem may be controlled either by providing holes (78) of various size or by providing a variable number of holes of a common size. Thus, this invention should be interpreted in light of the foregoing specification and should be limited only by the following claims and their equivalents.

What is claimed is:

1. In a shock absorbing device for a vehicle, said shock absorbing device including a fluid filled cylinder having a cylindrical axis and first and second ends, a piston rod extending axially away from and outwardly of said first end of said cylinder, a piston assembly having an axis that is aligned with the cylindrical axis, said piston assembly being mounted on said piston rod within the cylinder and thereby dividing the cylinder into a compression chamber adjacent said second end of said cylinder and a recoil chamber adjacent said first end of said cylinder, a compression head assembly secured within the cylinder near the second end thereof, said compression head assembly including a base member and valve means for providing fluid flow across the base member as said piston assembly slidably moves within the cylinder, the improvement of the compression head assembly comprising in combination:

(a) a one piece valve stem including a generally elongated hollow body having a first end and a closed second end, said first end terminating in a hollow cup shaped flange portion that extends generally radially outwardly therefrom, said flange portion including an inner radial area, an outer radial area, and at least one passage through the flange portion within the inner radial area thereof;

(b) said base member having first and second sides and an opening therethrough which is larger than the inner radial area of said flange portion of said one piece valve stem, the first and second sides of the base member adjacent the opening defining a base valve seat and a base retaining shoulder, respectively, the generally elongated body of the one piece valve stem being slidably fitted through the opening of the base member for reciprocal movement between a first position wherein the flange portion of the one piece valve stem abuts the base valve seat and a second position wherein the flange portion of the one piece valve stem is spaced apart from the base valve seat;

(c) an annular disk valve slidably fitted around the generally elongated body for reciprocal movement between a first position wherein the disk valve abuts the flange portion and a second position wherein the disk valve is spaced apart from the flange portion;

(d) a valve stop member secured to the second end of the generally elongated body of the one piece valve stem;

(e) a first bias member positioned between the disk valve member and the valve stop member, biasing the disk valve member toward its first position in abuttment with the flange portion to thereby close the passages(s) through the flange portion within the inner radial area;

(f) a second bias member positioned between the base retaining shoulder of the base member and the valve stop member, biasing the flange portion of the one piece valve stem toward its first position in abuttment with the base valve seat on the base member to thereby close the opening through the base member; and (g) said one piece valve stem, said annular disk valve, said valve stop member, and said first and second bias members cooperating with the base member to define the improved compression head assembly;

wherein the shock absorbing device has a compression mode and a recoil mode, the first position of the one piece valve stem in combination with the second position of the disk valve member defining a flow path for the fluid out of the compression chamber when the shock absorbing device is in the compression mode, and the second position of the one piece valve stem in combination with the first position of the disk valve member defining a flow path for fluid into the compression chamber when the shock absorbing structure is in a recoil mode, the dimensions of the flow path in the compression mode being substantially independent of the dimensions of the flow path in the recoil mode;

wherein at least the outer radial area of the flange portion of the one piece valve stem extends radially outward from the cylindrical axis to form a substantially part spherically shaped section to thereby define a surface on the flange portion which is generally transverse to the opening in the base member for sealing cooperation therewith in said first position;

wherein the flange portion of the one piece valve stem includes at least one shoulder section around the passages through the flange portion within the inner radial portion thereof, said shoulder section defining a flange valve seat which the annular disk valve abuts in its first position to sealingly close said openings; and wherein the flange portion further includes a recessed area adjacent the passages such that, when the annular disk valve is in its first position, the annular disk valve, the shoulder section, the generally elongated body and the inner radial area of the flange portion define a space which communicates with the passage through the flange portion to thereby provide a mechanical advantage for fluid pressure action against the annular disk valve and the first bias member.

2. The improvement of claim 1 wherein the opening of the base member is coined to thereby define the base valve seat on the base member.

3. The improvement of claim 1 wherein the first bias member is a coil spring fitted around the generally elongated body of the one piece valve stem.

4. The improvement of claim 3 wherein the second bias member is a coil spring fitted around the first bias member.

5. The improvement of claim 1 wherein the second bias member is a coil spring fitted around the generally elongated body of the one piece valve stem.

6. The improvement of claim 1 wherein the second side of the base member adjacent the opening through the base member includes a ledge which defines the base retaining shoulder to receive and position the second bias member.

7. The improvement of claim 1 wherein the generally elongated body includes a first section of relatively larger diameter, a second section of relatively smaller diameter, and a shoulder portion therebetween, said valve stop member fitting over the second section of relatively smaller diameter and abutting the shoulder portion of the generally elongated member.

8. The improvement of claim 1 wherein the second end of the generally elongated member includes a riveted end portion, said shoulder portion and said riveted end portion defining means for securing the valve stop member to the second end of the generally elongated body.

9. The improvement of claim 1 wherein the valve stop member is larger than the opening through the base member.

10. The improvement of claim 1 wherein the shock absorbing device comprises a shock absorber.

11. The improvement of claim 1 wherein the shock absorbing device comprises a strut.

12. The improvement of claim 1 wherein the shock absorbing device comprises a replacement cartridge for a strut.

13. The improvement of claim 1 wherein the generally elongated body of the one piece valve stem is substantially cylindrical, the first end of the substantially cylindrical body being open for communication with the compression chamber, and the second end of the substantially cylindrical body being said closed end.

* * * * *